Dec. 14, 1937.  J. DICHTER  2,102,357

METHOD AND APPARATUS FOR MAKING DOUBLE WALLED GLASS VESSELS

Filed April 20, 1934   2 Sheets-Sheet 1

Inventor:
Jakob Dichter
by
Atty.

Dec. 14, 1937.  J. DICHTER  2,102,357

METHOD AND APPARATUS FOR MAKING DOUBLE WALLED GLASS VESSELS

Filed April 20, 1934  2 Sheets-Sheet 2

*Inventor:*
Jakob Dichter
by *Harle Kirkpatrick*
Atty.

Patented Dec. 14, 1937

2,102,357

UNITED STATES PATENT OFFICE 2,102,357

METHOD AND APPARATUS FOR MAKING DOUBLE-WALLED GLASS VESSELS

Jakob Dichter, Berlin-Schoneberg, Germany

Application April 20, 1934, Serial No. 721,464
In Germany March 4, 1933

11 Claims. (Cl. 49—7)

My invention relates to the manufacture of double-walled glass vessels and more especially bottles of the Dewar type. It relates more particularly to a method and the means for producing such vessels and bottles in a simpler and more efficient manner than was hitherto possible.

Double-walled glass bottles, i. e. glass vessels formed with a neck of smaller diameter than the body, were hitherto produced in various manners, but in each case the neck was formed either before or during the formation of the body.

It is one of the characteristic features of the present invention that I first produce the double-walled body all in one piece and thereafter form the neck by restricting or narrowing down the portion of the double-walled body surrounding the entrance to the inner vessel.

In a preferred embodiment of my invention I produce the double-walled glass body by blowing in a mold a substantially cylindrical hollow body having the outer diameter of the double-walled bottle or the like to be produced, but having an axial length approaching or exceeding double the length of this bottle. While this cylindrical glass body is being blown out, or directly thereafter, I turn its bottom and the adjoining parts of the glass wall into the remaining part of the wall, thereby producing the inner wall and that part of the double-walled vessel from which the neck shall be formed. After this has been accomplished, I form the neck by applying pressure to the neck portion of the vessel, which is preferably heated to render the glass sufficiently plastic for this pressing operation.

Having thus described the main features of the process followed in producing a double-walled glass vessel with a restricted neck according to this invention, I will now proceed to describe in detail this process and the means for carrying it out, having reference to the drawings affixed to this specification and forming part thereof, which illustrate by way of example some embodiments of my invention in a purely diagrammatic manner.

Figure 1:
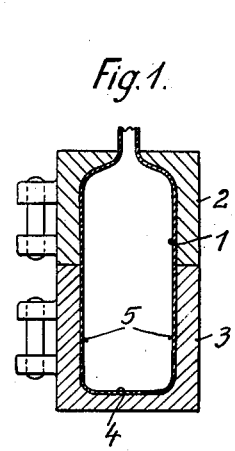
Fig. 1 is an axial section of a mold in two parts and of the hollow glass body molded therein by blowing, which is thereafter converted into a double-walled body of substantially half the length.
Figure 3:
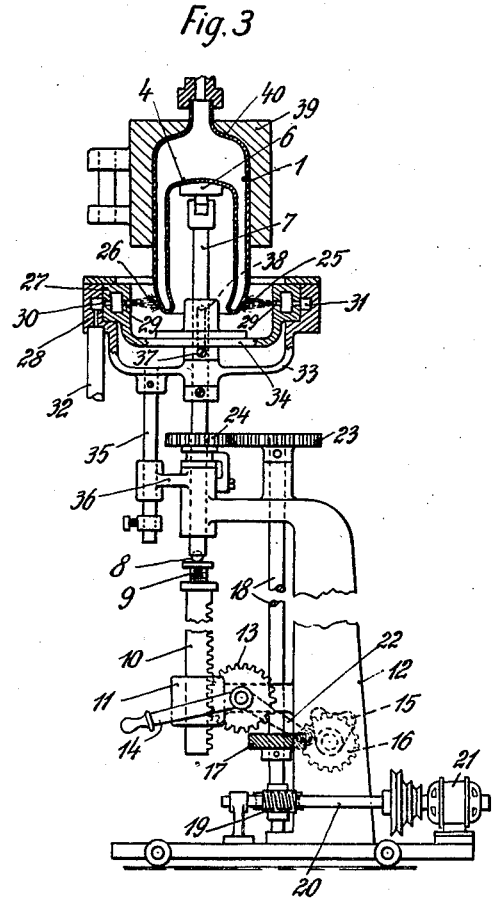
Fig. 3 is an elevation, partly in axial section, of a machine fit for use in the production of double-walled glass bodies of the kind here in view.

Referring to the drawings and first to Fig. 1, a hollow substantially cylindrical glass body 1 having about double the axial length of the double-walled bottle to be produced is blown out with the blowing tube (not shown) in a bipartite mold 2 and 3. Directly after this hollow body has been blown out and while the glass is still soft and plastic, the bottom 4 and the adjoining part 5 of the wall are turned in by exerting pressure on the bottom, the mold 3 having previously been opened. This turning in operation may be effected with the aid of the machine illustrated in Fig. 3, where 6 is the head of a plunger mounted on a rod 7, the lower end of which embraces a steel ball 8 resting on an abutment 9, which is mounted for vertical adjustment in the top end of a rack 10 guided in a support 11 fixed to the standard 12 of the machine. A toothed wheel 13 mounted for rotation on this arm and meshing with the rack 10 can be turned either way by means of a handlever 14, or, alternatively, by a cam wheel 15 mounted on a gear wheel 16, meshing with another gear wheel 17 mounted on the vertical shaft 18, which is set rotating by the worm 19 mounted on the shaft 20 of an electromotor 21, the cam 15 acting on the end of a lever 22 fixed to the hub of gear wheel 13.

A toothed wheel 23 mounted on the top end of shaft 18 meshes with the toothed wheel 24 on the vertical shaft 7, so that the electromotor 21 will also keep shaft 7 and the bottle 1 supported by the plunger head 6 rotating, while the neck portion 25 is exposed to the action of gas flames 26 directed against it by a burner in two parts 27, 28, the part 27 snugly surrounding the part 28. The part 27 has the form of a hollow ring formed with inner and outer perforations 29 and 30, respectively. The outer part 28 of the burner has the form of a ring surrounding the part 27, a groove 31 in the outer ring registering with the perforations 30, so that the inner part 27 of the burner can be supplied was gas through pipe 32, ring 28, groove 31 and perforations 30. Both rings 27 and 28 are supported by arms 33 and 34, respectively, embracing shaft 7. The arms 33 supporting the outer ring 28 are secured against rotation by a rod 35 mounted in an arm 36 of the machine. In contradistinction thereto the arms 34 are secured on the shaft 7 for free vertical movement and for rotation with the shaft by means of a pin 37 projecting into an axial groove 38 on the shaft.

The operation of this machine is as follows: after the molds 2 and 3 have been opened, the glass body 1 is placed in the mold 39 mounted above the machine and the plunger 6 is slowly raised either by means of the handle 14 or through the action of the electromotor 21, the bottom part of the glass wall being heated by the gas flames 26 issuing from the inner part 27 of the burner, which is set rotating with the shaft 7 through gearing 23, 24, worm 19 and electromotor 21. In this manner the bottom part of the glass body is turned in as shown in the drawings until the bottom 4 now resting on the plunger head 6 approaches the part 40 of the glass body, which is designed to form the outer bottom of the bottle.

When this has been done, the heated neck portion is ready to be operated upon by the neck forming tools.

Figure 2:
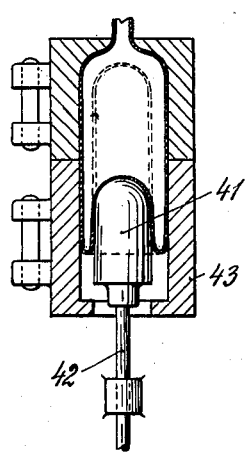
Fig. 2 is a similar view of a mold and glass body with means for turning same in during the blowing out of the glass.

Fig. 2 illustrates the method of turning in the bottom portion of the glass body, while this latter is being blown out. Here a plunger head 41 supported by a rod 42 forms the bottom of the mold 43 and on being lifted by suitable means causes the bottom portion of the glass body to be turned in, while it is still hot and surrounded by the mold.

Figure 4:
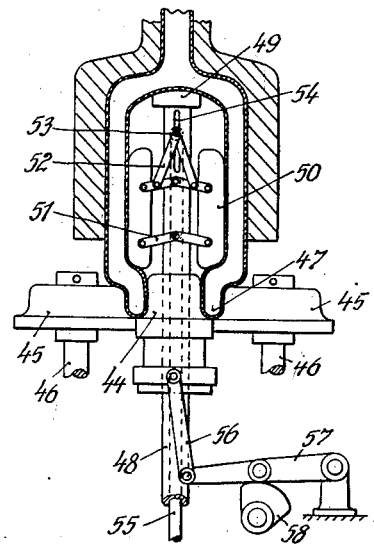
Fig. 4 is an elevation partly in axial section of a mold, glass body and means for forming same and more especially the neck portion thereof.

After the double-walled vessel has been molded in this or some other manner, its lowermost or neck portion, which has been heated by the gas flames 26 or by some other means, is now acted upon by an inner mandrel 44 (Fig. 4) entering the neck portion and by two profiled rolls 45 acting thereon from the outside, the rolls 45 and the spindles 46 supporting them being radially advanced in the direction towards the bottle axis and thereby molding the neck 47 as shown in Fig. 4. While this is going on, the inner part of the glass vessel is held against deformation and, if necessary, expanded by means of a tube 48 supporting the head 49 and supporting blades 50, which are linked to the tube by means of links 51 which are in their turn controlled by links 52 hinged by means of a pin 53 extending through a slot 54 in the tube wall to the top end of a rod 55, which extends into the tube 48 and can be displaced therein, so as to spread apart or contract the blades 50. The inner mandrel 44 is governed by a link 56 and lever 57, which is acted upon by a cam 58.

When the mandrel 44 has been introduced into the neck portion of the glass body, compressed air is blown into the space between the walls of the vessel and the rolls 45 are applied from without, whereby the soft glass on the inside of the neck portion is forced against the mandrel 44, while the outer wall of the neck portion is prevented from expanding by the rolls 45.

Figure 5:
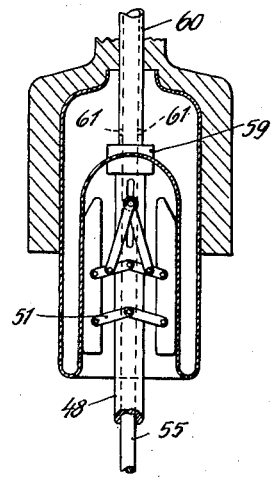
Fig. 5 is a sectional view similar to Fig. 4, and showing a modified support for the glass body.

Fig. 5 illustrates a device resembling the one shown in Fig. 4, however here the bottom portion of the glass body under treatment is held also from the outside by a molding head 59 mounted at the end of an axially adjustable pipe 60 perforated at 61, through which compressed air can be introduced into the glass body.

Figure 6:
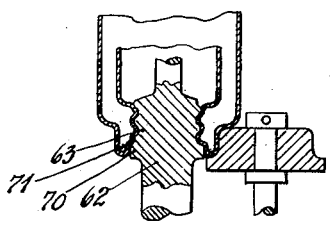
Fig. 6 is a similar view of a further neck-forming device.

Fig. 6 illustrates the molding of the neck portion with an inner thread. Here an inner mandrel 62 is introduced into the neck, which is formed with screw thread at 63 and with a flange 70 which forms a recess 71 for the accommodation of a rubber or cork ring.

Figure 7:
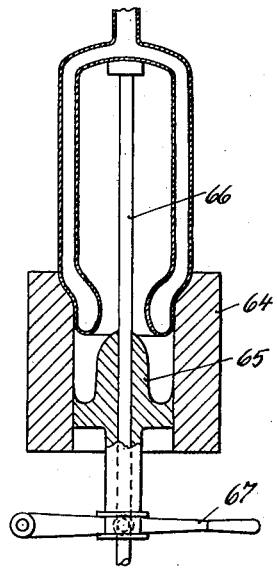
Fig. 7 illustrates a fourth form of apparatus for forming the neck.

Fig. 7 illustrates another neck forming device, in which the outer neck forming rolls 45 are dispensed with, the neck portion being entered from above into a neck forming mold 64, while an inner mandrel 65 mounted for axial displacement on the supporting rod 66 is lifted by means of hand lever 67 to enter the neck.

Figure 8:
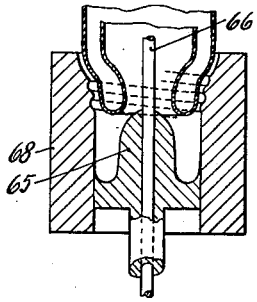
Fig. 8 illustrates still another form of apparatus for forming the neck.

As shown in Fig. 8, a neck with outer screw thread can be formed in a screw threaded mold 68 by blowing compressed air into the glass body, while the inner wall of the neck is supported and molded by the displaceable inner mandrel 65.

Obviously the operations of blowing out the initial glass body, thereafter turning it in and finally molding the neck need not be carried out in swift succession. Glass bodies such as illustrated in Fig. 1 or 2 may be produced in large quantities in the glass works and may be turned in and formed with necks afterwards. Alternatively the glass bodies may be blown out and turned in, for instance in the manner illustrated in Fig. 2, in the glass works and the necks formed in a different place.

I wish it to be understood that I do not desire to be limited to the exact details of construction shown and described for obvious modifications will occur to a person skilled in the art.

I claim:—

1. In the manufacture of double-walled, substantially bottle-shaped glass vessels in one piece the step of forming the neck by exerting centrally directed pneumatic pressure on the neck portion of the inner wall.

2. In the manufacture of double-walled, substantially bottle-shaped glass vessels in one piece the step of forming the neck by simultaneously exerting centrally directed pneumatic pressure on the neck portion of the inner wall and centrally directed mechanical pressure on the neck portion of the outer wall.

3. Glass molding device comprising in combination, an axially displaceable support for the glass to be molded, a ring-shaped burner rotatably surrounding said support and a stationary ring-shaped gas supplying means embracing said burner.

4. Glass molding device comprising in combination, an axially displaceable support for the glass to be molded, glass heating means arranged coaxially to said support, means for axially displacing said support and means for rotating said heating means and said support.

5. Glass molding device comprising a mandrel and a roll arranged in juxtaposition, said mandrel and roll being shaped to enclose between them the cross-section of the rounded neck of a double-walled glass bottle, and means for exerting pneumatic pressure on the neck from between its double walls.

6. The process of manufacturing double walled, substantially bottle-shaped glass vessels which comprises forming a single-walled bottle-shaped vessel of substantially double the axial length of the double-walled vessel to be produced, turning the bottom and about one-half of the cylindrical portion of said single walled vessel axially into the cylindrical top portion of said single-walled vessel to convert same into a double-walled vessel and exerting centrally directed pneumatic pressure on the portion of the inner wall surrounding the entrance to the inner cavity of said vessel, to form a neck.

7. The process of manufacturing double-walled, substantially bottle-shaped glass vessels which comprises forming a single-walled bottle-shaped vessel of substantially double axial length of the double-walled vessel to be produced, turning the bottom and about one-half of the cylindrical portion of said single walled vessel axially into the cylindrical top portion of said single-walled vessel to convert same into a double-walled vessel and exerting centrally directed pneumatic pressure on the portion of the inner wall and centrally directed mechanical pressure on the portion of the outer wall surrounding the entrance to the inner cavity of said vessel, to form a neck.

8. Glass blowing mold for the manufacture of double-walled glass vessels in one piece, comprising two axially superposed parts, one a top part formed with a blow opening, the other a bottom part said parts being of substantially equal length, a plunger displaceable relative to said bottom part and means for axially moving said plunger through both said parts and into close proximity of the blow opening in said top part.

9. Glass molding device comprising in combination, a mold in two superposed parts, for the production of a double-walled bottle, each part having internally substantially the axial length of the inner wall of the double-walled bottle to be produced therein, axially movable means for turning in the bottom portion of a bottle-shaped blank seated in the top part and equalling in length the axial length of both parts of said mold, and means movable vertically in opposite direction and extending in alignment with said turning-in means and through the blow opening of said top part of said mold for holding the turned-in portion of the glass-bottle applied against said turning-in means.

10. In the method of forming a double-walled vessel having a neck portion differing in cross sectional area from the body portion thereof, those steps which consist in forming a double-walled vessel having a neck portion of substantially the same cross sectional area as the body portion, the inner and outer walls being united only at the neck portion of the vessel, and then varying the cross sectional area of the neck portion of the double-walled vessel to that desired.

11. The process of manufacturing double-walled glass vessels, which comprises forming a tubular single walled glass body having a length substantially twice that of the double walled vessel to be formed and having a closed end and an open end, the walls of said body being of substantially uniform thickness throughout, forcing said closed end into the body toward and into proximity to said open end by a progressive bending of the side wall while the side wall of the body is plastic, and maintaining the thus formed inner wall in spaced relation to said side wall.

JAKOB DICHTER.